US009725074B2

(12) United States Patent
Huebner et al.

(10) Patent No.: US 9,725,074 B2
(45) Date of Patent: Aug. 8, 2017

(54) FRONT GRILLE EMBLEM FOR RELEASING A HOOD AND FILLING A WINDSHIELD WASHER FLUID RESERVOIR OF A MOTOR VEHICLE

(71) Applicant: FORD GLOBAL TECHNOLOGIES, LLC, Dearborn, MI (US)

(72) Inventors: Annette Lynn Huebner, White Lake, MI (US); Kristin Ann Hellman, Walled Lake, MI (US); Artur Sakarian, Birmingham, MI (US); Ryan Welch, Ottawa Lake, MI (US); Matthew Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 14/942,132

(22) Filed: Nov. 16, 2015

(65) Prior Publication Data

US 2017/0137000 A1 May 18, 2017

(51) Int. Cl.

| | |
|---|---|
| ***B60J 7/00*** | (2006.01) |
| ***B60S 1/50*** | (2006.01) |
| ***B62D 25/08*** | (2006.01) |
| ***B60R 13/00*** | (2006.01) |

(52) U.S. Cl.

CPC .............. *B60S 1/50* (2013.01); *B60R 13/005* (2013.01); *B62D 25/085* (2013.01)

(58) Field of Classification Search

CPC .... B60S 1/481; B60S 1/52; B60S 1/50; B60S 1/486; B60S 1/524; Y10S 318/02; B62D 25/081

USPC .......................................... 296/193.1; 428/31

See application file for complete search history.

(56) References Cited

U.S. PATENT DOCUMENTS

| | | | | |
|---|---|---|---|---|
| 2,729,487 A * | 1/1956 | Krause | E05B 83/24 | 292/198 |
| 4,977,695 A * | 12/1990 | Armbruster | B60R 13/005 | 40/541 |
| 6,044,517 A * | 4/2000 | Zendler | B60S 1/50 | 137/587 |
| 6,106,912 A * | 8/2000 | Balog | B60R 13/005 | 280/727 |
| 7,303,035 B2 | 12/2007 | Muia-Longman | | |
| 2002/0096378 A1* | 7/2002 | Kobayashi | B60K 11/08 | 180/68.6 |
| 2005/0016619 A1* | 1/2005 | Winterling | B60S 1/50 | 141/2 |

(Continued)

FOREIGN PATENT DOCUMENTS

| | | |
|---|---|---|
| KR | 20050036388 A | 4/2005 |
| KR | 20050051429 A | 6/2005 |
| KR | 20090063821 A | 6/2009 |

(Continued)

OTHER PUBLICATIONS

English machine translation of KR20050036388A.

(Continued)

*Primary Examiner* — Kiran B Patel

(74) *Attorney, Agent, or Firm* — Jason Rogers; King & Schickli, PLLC

(57) ABSTRACT

A front grille emblem is provided for a motor vehicle. That front grille emblem includes an integral hood latch release and a windshield washer fluid receiver.

20 Claims, 10 Drawing Sheets

(56) References Cited

U.S. PATENT DOCUMENTS

2011/0051451 A1* 3/2011 Stempinski .............. B60Q 1/50
362/545
2013/0107046 A1* 5/2013 Forgue .................... B60R 11/04
348/148

FOREIGN PATENT DOCUMENTS

WO 2011070012 A1 6/2011
WO 2015088461 A1 6/2015

OTHER PUBLICATIONS

English machine translation of KR20050051429A.
English machine translation of KR20090063821A.
English machine translation of WO2011070012A1.

* cited by examiner 10
72
74
78
57
76
E
56
58
D
68
70
55
75

66
10
70
78
56
58
57
60
C
55
74
62
64

10
56
58
57
55

FRONT GRILLE EMBLEM FOR RELEASING A HOOD AND FILLING A WINDSHIELD WASHER FLUID RESERVOIR OF A MOTOR VEHICLE

TECHNICAL FIELD

This document relates generally to the motor vehicle equipment field and, more particularly, to an apparatus for releasing a hood and filling a windshield washer fluid reservoir of a motor vehicle. In one particularly useful embodiment that apparatus comprises a front grille emblem for the motor vehicle.

BACKGROUND

Today's motor vehicles generally require an operator to open the vehicle hood in order to refill the windshield washer fluid. This involves the steps of opening the primary hood latch utilizing a lever or button provided in the motor vehicle interior, opening the auxiliary hood latch utilizing a lever at the front of the motor vehicle, finding and opening the washer fluid reservoir in the underhood compartment, filling the windshield washer fluid reservoir with washer fluid and then closing the hood.

This procedure involves several inconvenient and sometimes frustrating steps. More specifically, on many vehicles the auxiliary hood release latch at the front of the motor vehicle is not easy to locate. On many vehicles one must reach under the hood and run a hand along the top of the motor vehicle grille seeking to locate the level which is hidden from view. This not only results in dirty hands but also potential frustration if the latch lever is not found quickly.

It is also significant to note that the engine compartment is often hot during the windshield washer fluid refilling task as the low fluid level is typically discovered while driving. This creates an additional level of hazard while working under the hood to perform this task.

This document relates to a new and improved apparatus for releasing the hood and filling the windshield washer fluid reservoir of a motor vehicle. That apparatus, which may take the form of a front grille emblem, includes an integral hood latch release and windshield washer fluid receiver that are prominently visible and very convenient and easy to utilize. In fact, the hood does not even have to be open to refill the windshield washer reservoir. Thus, the new front grille emblem described herein represents a significant advance in the art.

SUMMARY

In accordance with the purposes and benefits described herein, a front grille emblem is provided for a motor vehicle. That front grille emblem comprises an integral hood latch release and windshield washer fluid receiver. That front grille emblem is displaceable between an emblem display position, a hood latch release position and a windshield washer fluid fill position.

In accordance with an additional aspect, an apparatus is provided for releasing a hood and filling a windshield washer fluid reservoir of a motor vehicle. That apparatus comprises an integral hood release actuator and a windshield washer fluid receiver. In one possible embodiment, the hood release actuator is pivotally connected to the windshield washer fluid receiver. Further, a cap may be connected to the windshield washer fluid receiver and displaceable between an opened position and a closed position. A spring may be provided to bias the cap to the open position. Further the apparatus may include an abutment for engaging and holding the cap in a closed position when the apparatus is in the home position. Where the apparatus includes a front grille emblem, that home position is the front grille emblem display position.

In yet another embodiment, the windshield washer fluid receiver is pivotally connected to the motor vehicle.

In still another embodiment the windshield washer fluid receiver is pivotally connected to the motor vehicle and the hood release actuator is pivotally connected to the windshield washer fluid receiver.

In still another embodiment, the windshield washer fluid receiver forms an inner portion of the front grille emblem and a hood release actuator forms a perimeter portion of the front grille emblem.

In the following description, there are shown and described several preferred embodiments of the apparatus/front grille emblem for releasing a hood and filling a windshield washer fluid reservoir of a motor vehicle. As it should be realized, the emblem/apparatus is capable of other, different embodiments and its several details are capable of modification in various, obvious aspects all without departing from the emblem/apparatus as set forth and described in the following claims. Accordingly, the drawings and descriptions should be regarded as illustrative in nature and not as restrictive.

BRIEF DESCRIPTION OF THE DRAWING FIGURES

Reference will now be made in detail to the present preferred embodiments of the apparatus/emblem, examples of which are illustrated in the accompanying drawing figures.

DETAILED DESCRIPTION

Figure 1A:
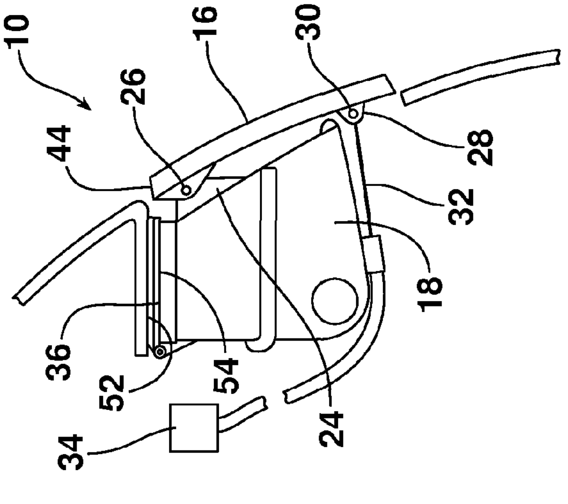
FIGS. 1A-1C are schematic side elevational illustrations of a first embodiment of the apparatus/emblem in respective display, hood latch release and windshield washer fluid fill positions.
Figure 1B:
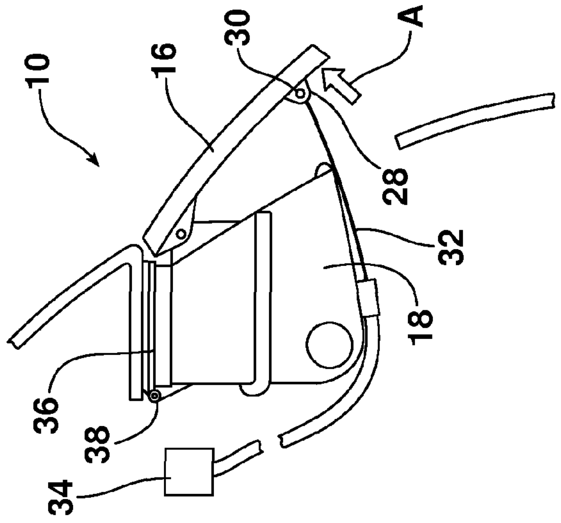
Figure 1C:
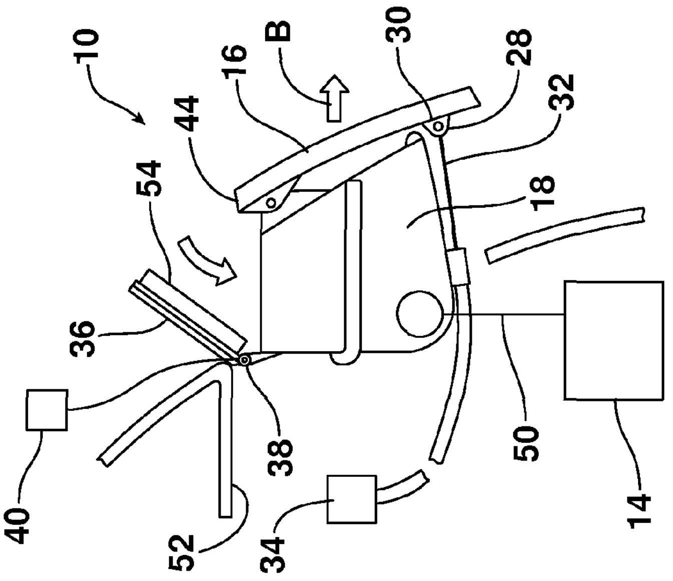
Figure 2A:
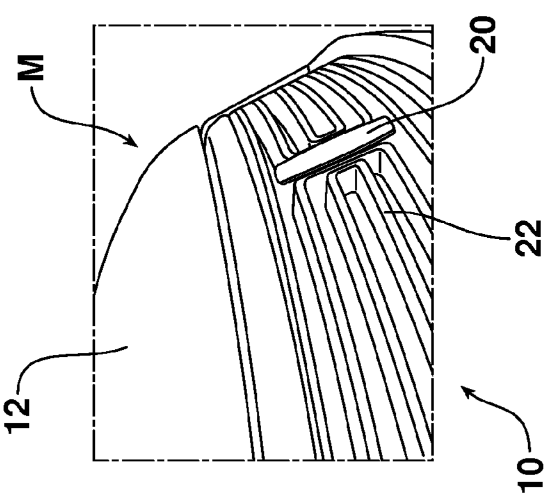
FIGS. 2A-2D are perspective views of the emblem embodiment illustrated in FIGS. 1A-1C illustrating the emblem in respective emblem display, hood release primed, hood release activated and windshield washer fluid fill positions.
Figure 2B:
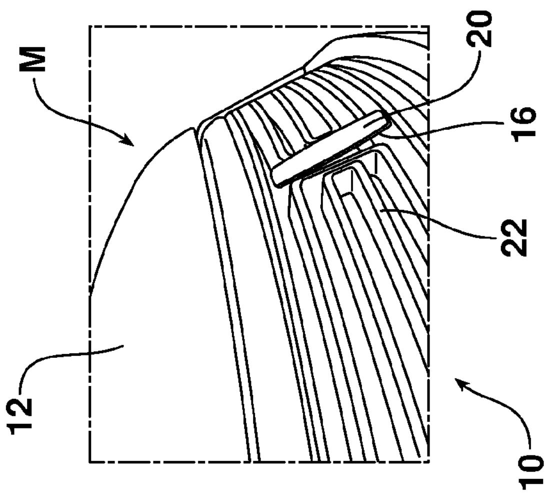
Figure 2C:
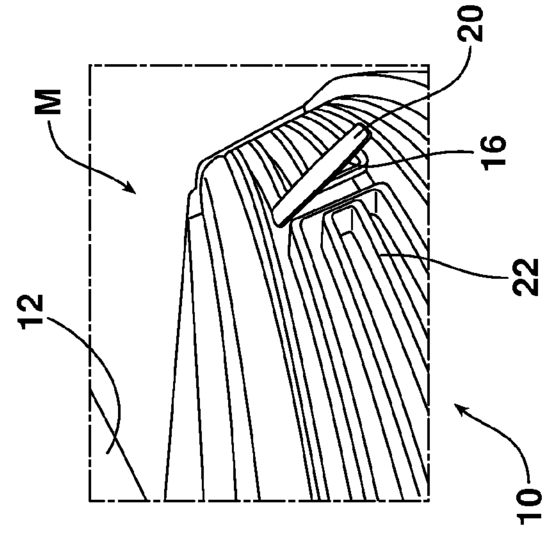

Reference is now made to FIGS. 1A-1C and 2A-2D illustrating a first embodiment of the apparatus 10 for releasing a hood 12 and filling a windshield washer fluid reservoir 14 of a motor vehicle. As illustrated, the apparatus 10 comprises an integral hood release actuator 16 and a windshield washer fluid receiver 18. As best illustrated in FIGS. 2A and 2B, in this particular embodiment the hood release actuator 16 includes a front face forming a front grille emblem 20 displayed in the grille 22 of the motor vehicle M.

As best illustrated in FIGS. 1A and 1B, the hood release actuator 16 is pivotally connected to a lug at 24 on the windshield washer fluid reservoir 14 by means of a pivot pin 26. Further, the hood release actuator 16 includes a lug 28 connected by means of a pin 30 for securing the end of a hood release actuator cable 32. The other end of the cable 32 is connected to the secondary hood latch 34 for releasing the hood 12.

When one wishes to open the hood, that individual first pulls the hood release lever or depresses the hood release button (not shown) inside the interior of the motor vehicle M to release the primary hood latch. When this is done the hood release actuator 16 is displaced from the normal or home emblem display position illustrated in FIGS. 1A and 2A to the secondary hood release primed position illustrated in FIG. 2B. Next the individual exits the motor vehicle, walks around to the front thereof, engages the lower edge of the hood release actuator 16 and pulls to pivot the actuator about the pivot pin 26 (note action arrow A in FIG. 1B) until the apparatus 10 is in the hood release position illustrated in FIGS. 1B and 2C and the hood 12 is opened.

As best illustrated in FIGS. 1A-1C, the apparatus 10 also includes a cap 36 pivotally connected by means of the pivot pin 38 to the windshield washer fluid receiver 18 and displaceable between an open position illustrated in FIG. 1C and a closed position illustrated in FIGS. 1A and 1B. As should be appreciated, a coil spring 40 may be provided to bias the cap 36 into the open position (see FIG. 1C).

When one wishes to fill the windshield washer fluid reservoir 14 with windshield washer fluid, one engages the top edge 44 of the hood release actuator 16/front grille emblem 20 and slides the windshield washer fluid receiver 18 forward in the direction of action arrow B (see FIG. 1C) so as to project outwardly from the grille 22. As this is done, the coil spring 40 opens the cap 36 so that one may pour windshield washer fluid from a jug 48 into the open top of the windshield washer fluid receiver 18. Note FIG. 2D (cap 36 removed so as to better show the pouring of the windshield washer fluid into the receiver 18). As should be appreciated, the windshield washer fluid passes through the windshield washer fluid receiver 18 and along the line 50 to fill the windshield washer fluid reservoir 14.

Figure 2D:
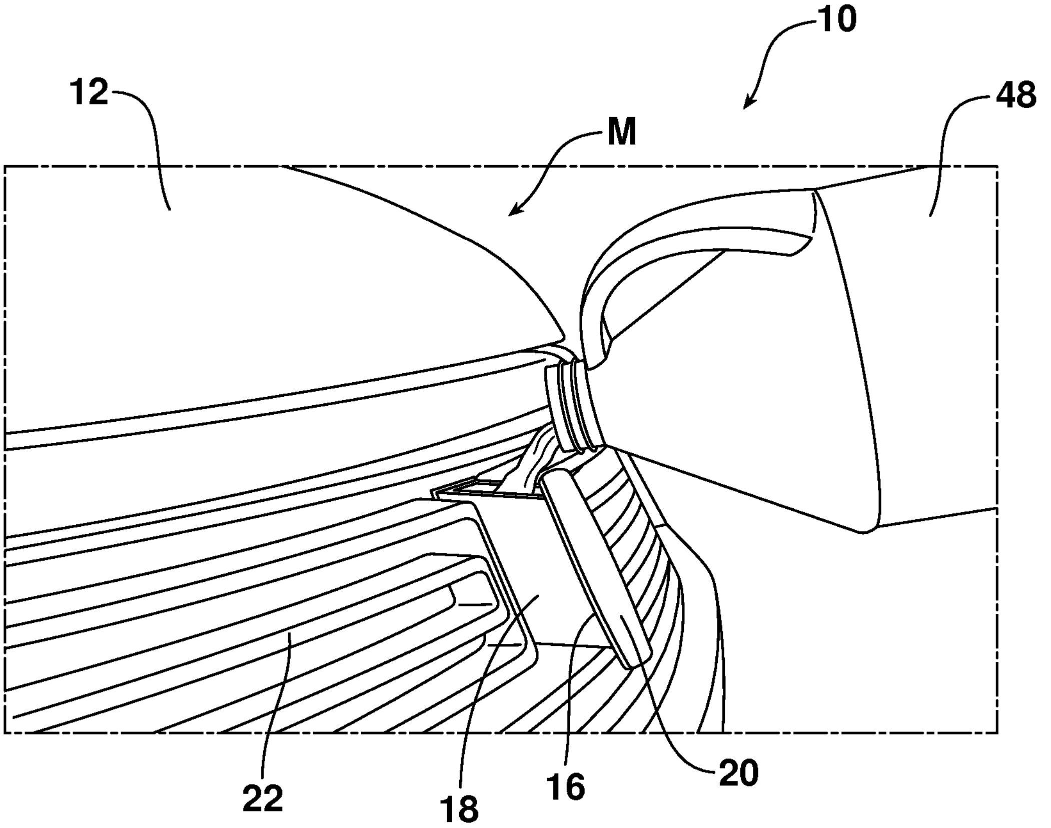

When one is done adding windshield washer fluid, one pushes the apparatus 10 from the windshield washer fluid fill position illustrated in FIGS. 1C and 2D back into the grille 22 until the apparatus is again in the emblem display position illustrated in FIGS. 1A and 2A. As this is done, an abutment 52 carried on the motor vehicle behind the grille 22 engages the top of the cap 36 and functions to displace the cap into and hold the cap down in the closed position so that the seal 54 on the cap seals the windshield fluid receiver 18 closed to prevent evaporation of windshield washer fluid.

Figures 3A, 3B, 3C:
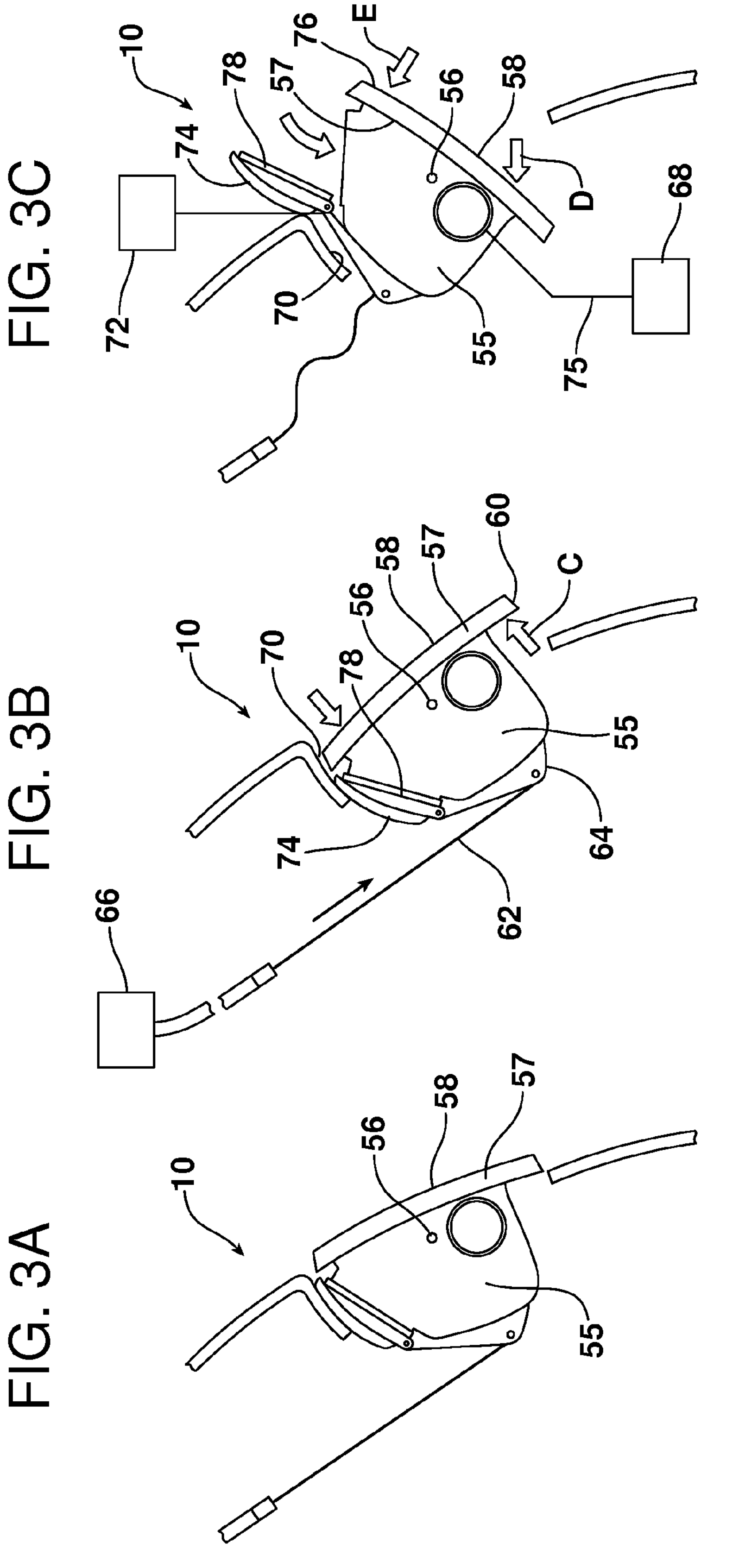
FIGS. 3A-3C are respective schematic side elevational views of a second embodiment of the apparatus/emblem in respective display, hood latch release and windshield washer fluid fill positions.

Reference is now made to FIGS. 3A-3C illustrating yet another embodiment of the apparatus 10. In this embodiment, the windshield washer fluid receiver 55 is pivotally connected to the motor vehicle by two opposed pins 56 (only one illustrated, the other is hidden) forming a trunnion. The hood release actuator 57 in this embodiment is fixed to the windshield washer fluid receiver 55. The front face of the hood release actuator 57 may again form a front grille emblem 58.

When one wishes to open the hood 12, the operator pulls the primary hood latch lever or depresses the primary hood latch release button (not shown) in the interior of the vehicle causing the fluid receiver 55 and fixed hood release actuator 57 to pivot in the direction of action arrows C into the hood release primed or ready position. Next, the operator walks around to the front of the vehicle. He then engages the bottom edge 60 of the actuator 57 with his fingers and pivots the hood release actuator further in the direction of action arrow C. This pulls the cable 62 connected to the lug 64 at the rear of the fluid receiver 55. The other end of that cable is connected to the secondary hood latch 66 which is released allowing the hood 12 to open. When the hood 12 is subsequently closed, the apparatus 10 returns to the emblem display position, illustrated in FIG. 3A.

In contrast, when one wishes to replenish the windshield washer fluid in the windshield washer fluid reservoir 68 one pushes on the bottom portion 70 of the front grille emblem 58 located below the pivot pins 56 (note action arrow D in FIG. 3C) causing the top of the fluid receiver 55 to pivot forward. As the top of the fluid receiver 55 clears the abutment 70 the coil spring 72 biases the fluid receiver cap 74 into the open position allowing one to then fill the fluid receiver 55 with washer fluid. That washer fluid then passes from the receiver 55 through the line 75 to the fluid reservoir 68. When filled, the operator pushes on the upper portion 76 of the emblem 58 above the pivot pins 56 (note action arrow E in FIG. 3C) to return the apparatus 10 from the windshield washer fluid fill position illustrated in FIG. 3C to the emblem display position illustrated in FIG. 3A. As this is done, the abutment 70 engages the top of the cap 74 thereby returning the cap into a closed position with the seal 78 sealing the windshield washer fluid receiver 55.

Figure 4A:
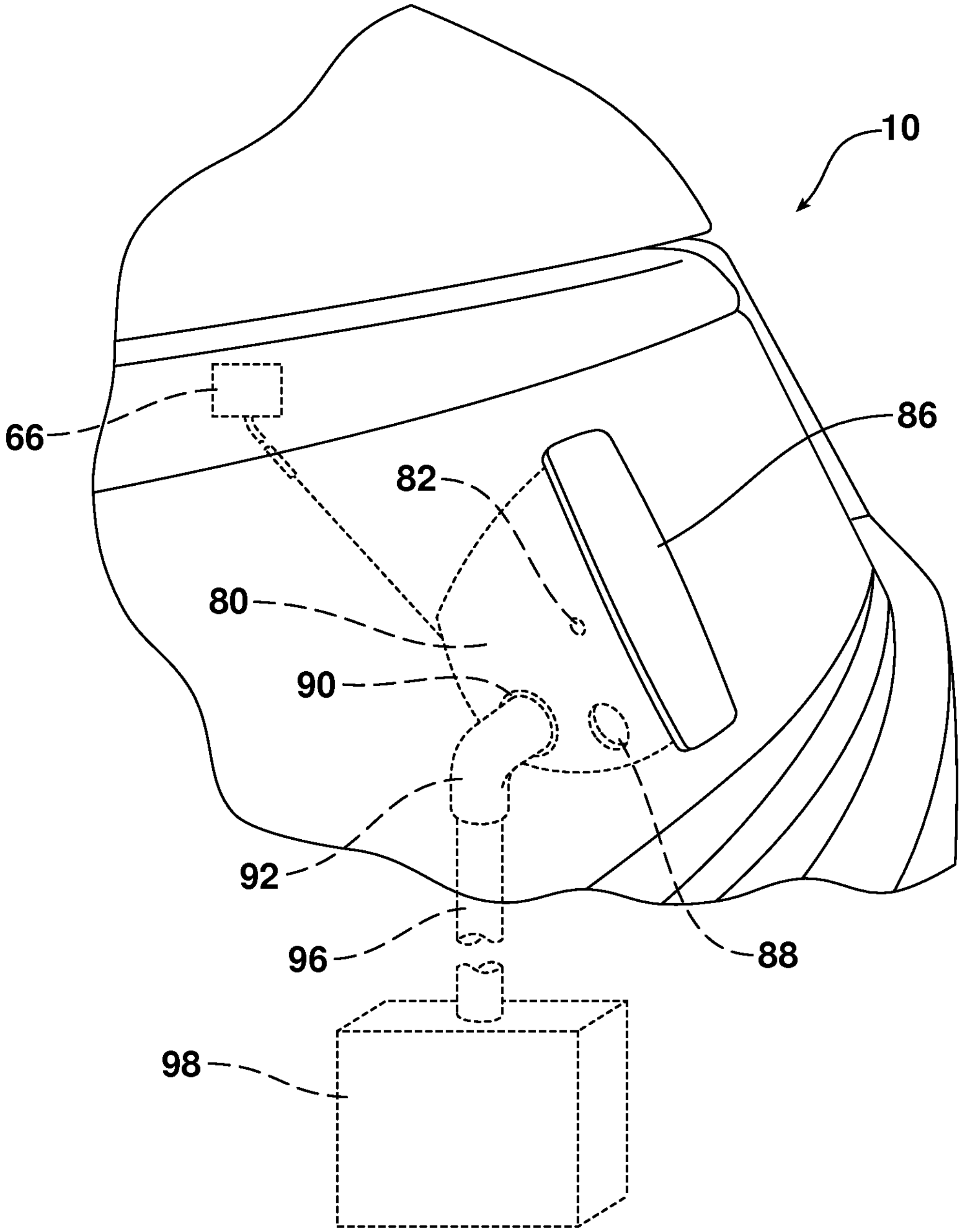
FIGS. 4A-4C are schematic side elevational views of still another embodiment of the apparatus/emblem in respective emblem display, hood latch release and windshield washer fluid fill positions.
Figure 4B:
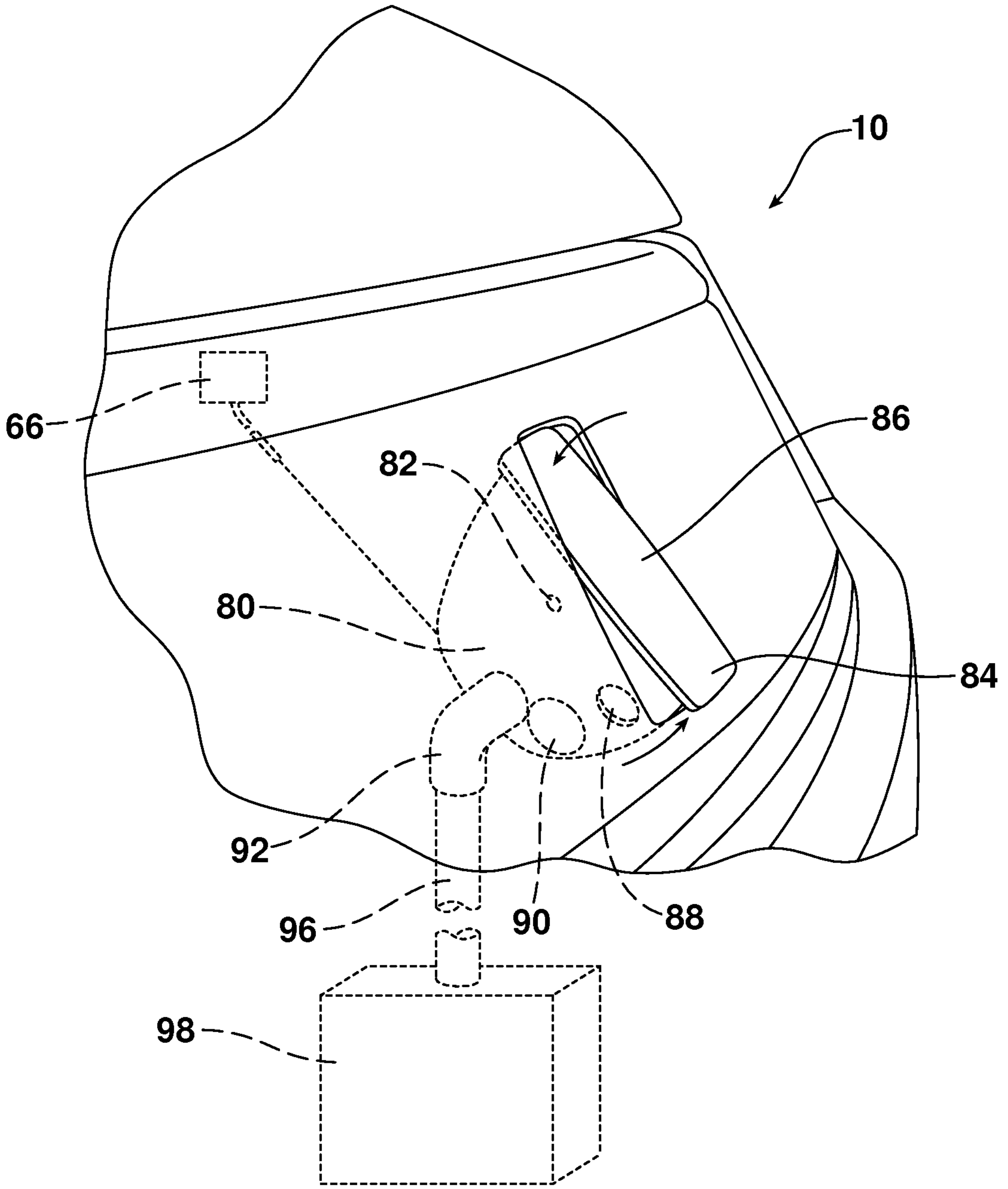
Figure 4C:
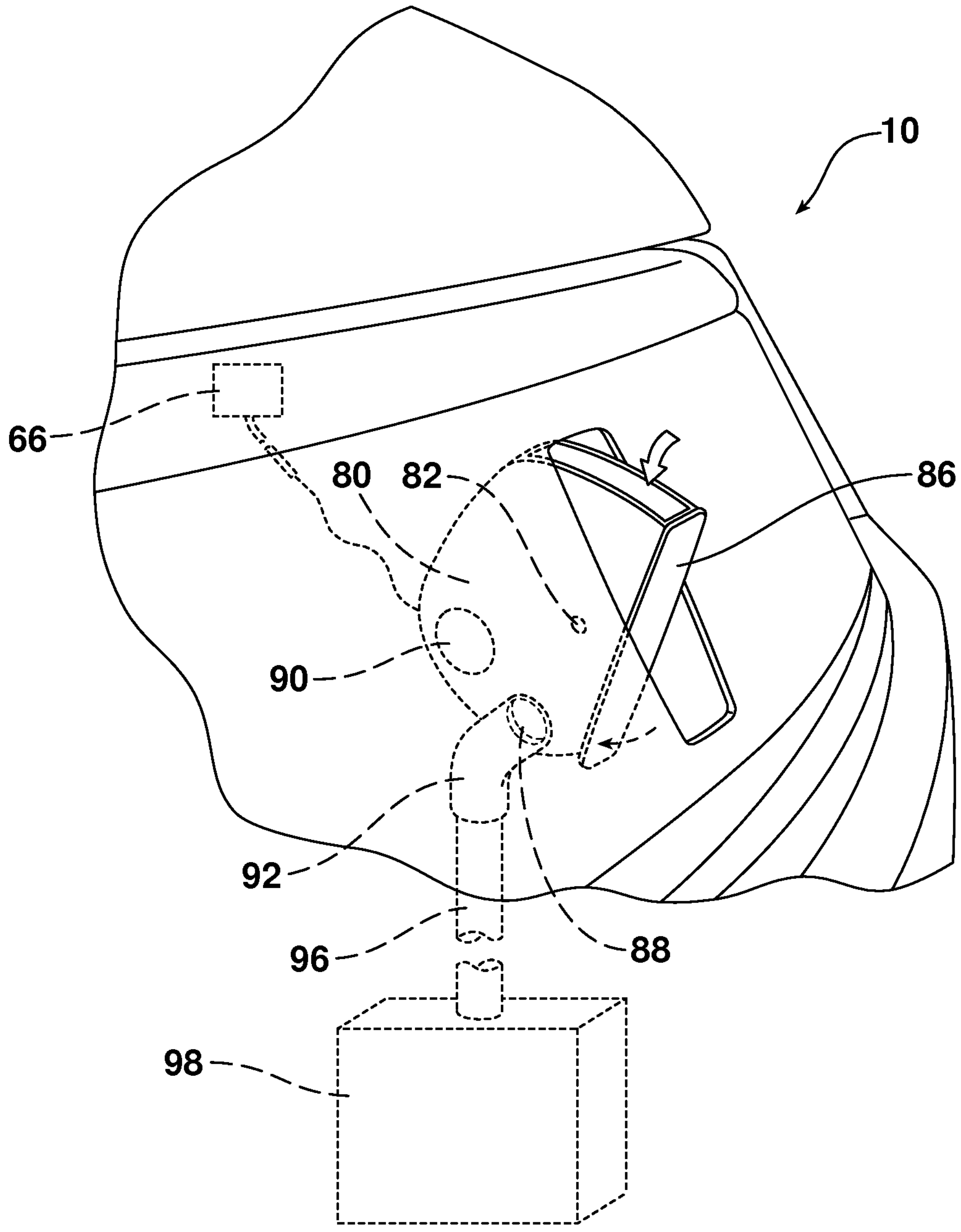

Reference is now made to FIGS. 4A-4C illustrating yet another embodiment of the apparatus 10. In this embodiment the windshield washer fluid receiver 80 again includes opposed pivot pins 82 just as illustrated in the previous embodiment of FIGS. 3A-3C. Further, a hood release actuator 84 is again fixed to the fluid receiver 80 and the front face again forms a front grille emblem 86. Thus, the apparatus 10 illustrated in FIGS. 4A-4C is utilized to release the secondary hood latch 66 in the same manner as illustrated in FIGS. 3A and 3B (note FIGS. 4A and 4B).

In contrast to the embodiment of the apparatus 10 illustrated in FIGS. 3A-3C, the embodiment illustrated in FIGS. 4A-4C does not include the cap 74. Instead, the apparatus 10 in FIGS. 4A-4C includes a discharge port 88 in the sidewall of the fluid receiver 80. When the apparatus 10 is in the emblem display position illustrated in FIG. 4A, the sidewall 90 of the fluid receiver 80 seals against a rubber boot 92 fixed to the motor vehicle behind the grille 94. As should be appreciated, that rubber boot 92 is in communication with the hose or line 96 leading to the windshield washer fluid reservoir 98.

In contrast, when the apparatus 10 is in the windshield washer fluid fill position illustrated in FIG. 4C, the discharge port 88 is aligned with the lumen in the rubber boot 92 with the rubber boot engaging the margins of the fluid receiver 80 around the port. Thus, when windshield washer fluid is poured into the receiver 80, that fluid flows through the discharge port 88 into the rubber boot 92 and then through the hose/line 96 for delivery to the fluid reservoir 98. At the end of the filling process, the apparatus 10 is then again returned to the emblem display position illustrated in 4A so that the sidewall 90 of the receiver 80 again seals against the rubber boot 92 thereby closing the system against evaporation.

Figure 5C:
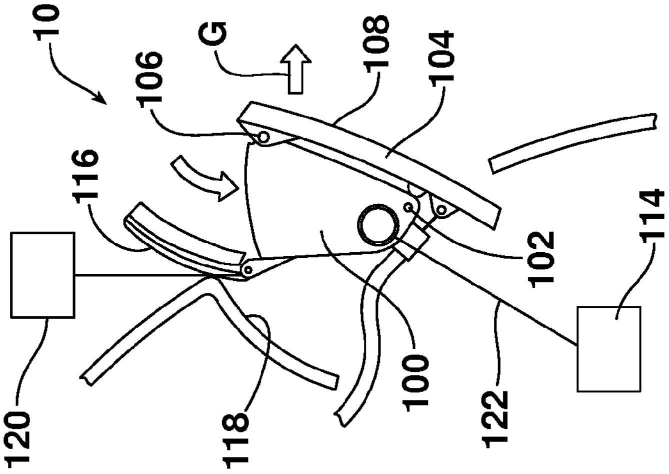
FIGS. 5A-5C are schematic side elevational views of yet another embodiment of the apparatus/emblem in respective emblem display, hood latch release and windshield washer fluid fill positions.
Figure 5B:
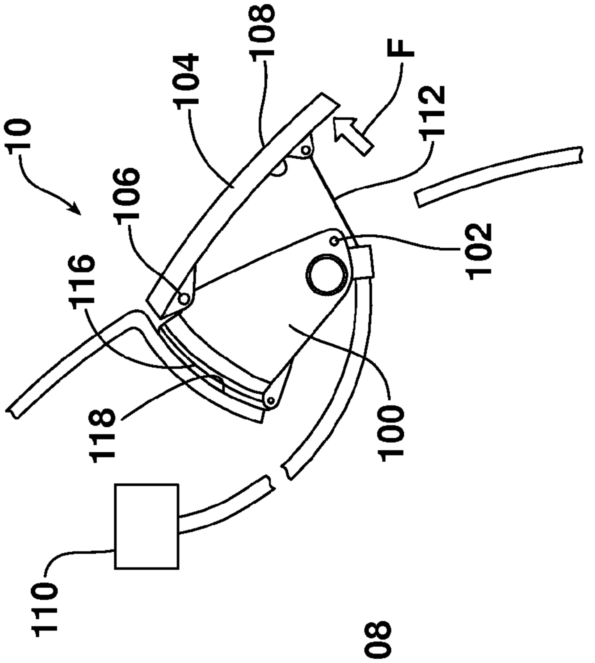
Figure 5A:
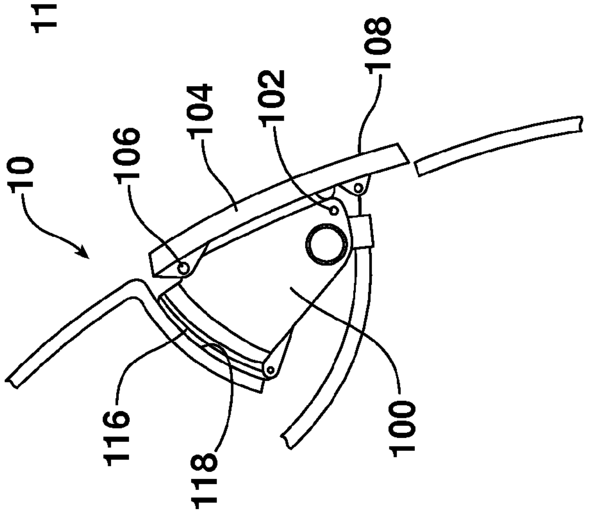

Reference is now made to FIGS. 5A-5C illustrating still another embodiment of the apparatus 10. FIG. 5A shows that embodiment in the emblem display position. FIG. 5B shows that embodiment in the secondary hood latch release position and FIG. 5C shows that embodiment in the windshield washer fluid fill position.

In this embodiment, the windshield washer fluid receiver 100 is pivotally connected to the motor vehicle via opposed pivot pins 102 provided at a bottom corner thereof. The hood release actuator 104 is pivotally connected to the top of the fluid receiver 100 by means of the pivot pin 106. The front face of the hood release actuator may again form a front grille emblem 108 if desired.

As illustrated in FIG. 5B one is able to release the secondary latch and open the hood 12 by pivoting the hood release actuator 104 about the pivot pins 106 in the direction of action arrow F. As illustrated, that actuator 104 is connected to the secondary hood latch 110 by means of the cable 112. When the hood 12 is subsequently closed, the apparatus 10 returns to the emblem display position illustrated in FIG. 5A.

In contrast, when one wishes to fill the windshield washer fluid reservoir 114, one tips the windshield washer fluid receiver 100 forward (note action arrow G in FIG. 5C) about the pivot pins 102. As the cap 116 clears the abutment 118, the coil spring 120 opens the cap allowing one to pour windshield washer fluid into the receiver 100. That fluid then flows through the line 122 filling the windshield washer fluid reservoir 114. When filled, one pushes on the front of the emblem 108 to return the apparatus 10 to the emblem display position illustrated on FIG. 5A.

Figure 6A:
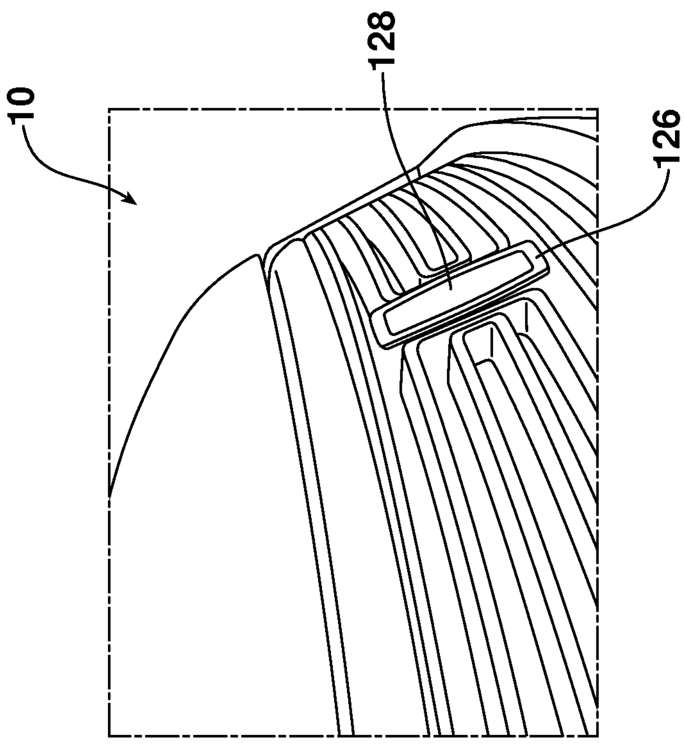
FIGS. 6A-6C are perspective views of yet another embodiment of the apparatus/emblem in respective emblem display, hood latch release and windshield washer fluid fill positions.
Figure 6B:
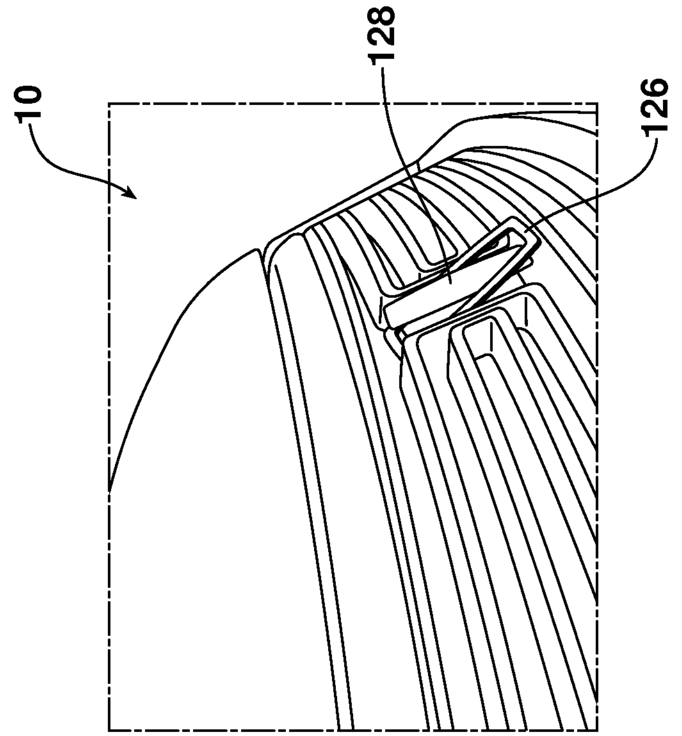
Figure 6C:
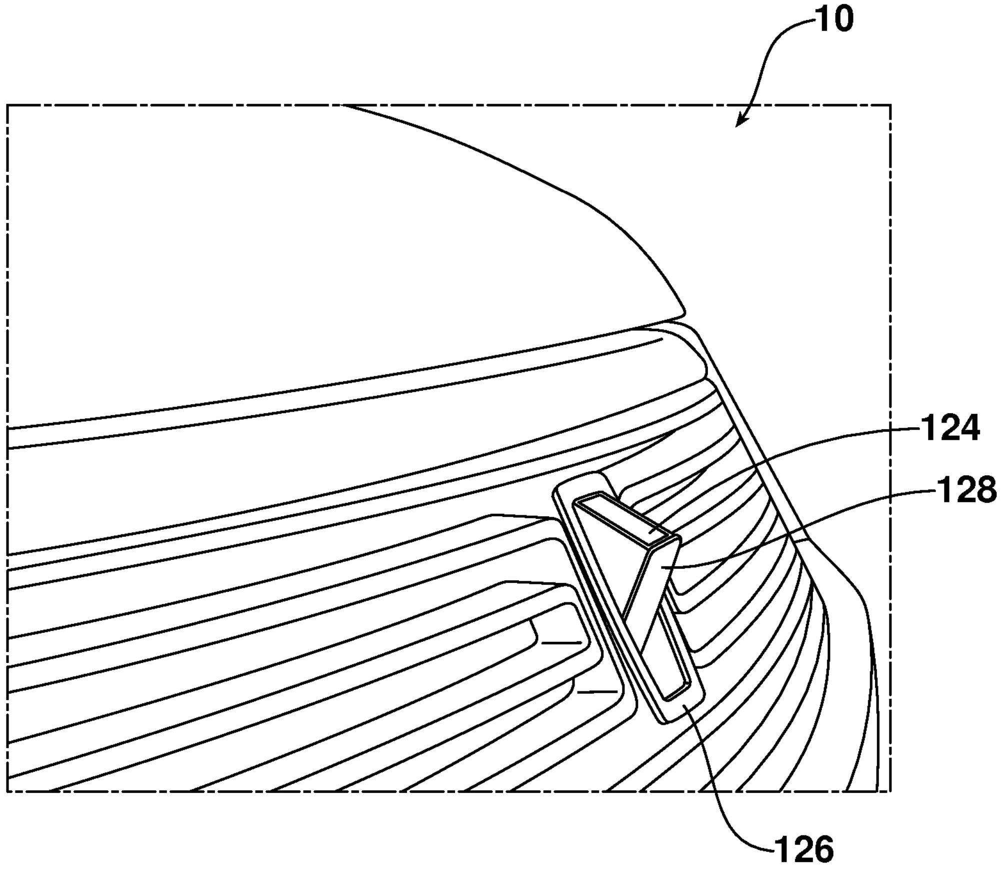

Reference is now made to FIGS. 6A-6C illustrating still another embodiment of the apparatus 10. In this embodiment, the windshield washer fluid receiver 124 and the secondary hood latch actuator 126 are both pivotally connected to the motor vehicle. The front face 128 of the windshield washer fluid receiver 124 forms an inner portion of the front grille emblem 130 while the front face of the hood latch actuator 126 forms an outer, perimeter portion of the emblem. FIG. 6A shows the apparatus of this embodiment in the emblem display position. FIG. 6B illustrates the secondary hood latch actuator 126 in the hood release position. FIG. 6C illustrates the apparatus 10 of this embodiment in the windshield washer fluid fill position. After filling one may push on the receiver 124 to pivot it back into the emblem display position illustrated in FIG. 6A.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A front grille emblem for a motor vehicle, comprising:
an integral hood latch release and windshield washer fluid receiver.

2. The front grille emblem of claim 1 displaceable between a display position, a hood latch release position and a windshield washer fluid fill position.

3. An apparatus for releasing a hood and filling a windshield washer fluid reservoir of a motor vehicle, comprising:
an integral hood release actuator and a windshield washer fluid receiver.

4. The apparatus of claim 3 further including a front grille emblem.

5. The apparatus of claim 4 wherein said hood release actuator is pivotally connected to said windshield washer fluid receiver.

6. The apparatus of claim 5, further including a cap pivotally connected to said windshield washer fluid receiver and displaceable between an opened position and a closed position.

7. The apparatus of claim 6, further including a spring biasing said cap into said opened position.

8. The apparatus of claim 7, wherein said apparatus is displaceable between a front grille emblem display position, a hood latch release position and a windshield washer fluid fill position.

9. The apparatus of claim 8, further including an abutment for engaging and holding said cap in said closed position when said apparatus is in said front grille emblem display position.

10. The apparatus of claim 4, wherein said windshield washer fluid receiver is pivotally connected to said motor vehicle.

11. The apparatus of claim 10, further including a cap pivotally connected to said windshield washer fluid receiver and displaceable between an opened position and a closed position.

12. The apparatus of claim 11, further including a spring biasing said cap into said opened position.

13. The apparatus of claim 12, wherein said apparatus is displaceable between a front grille emblem display position, a hood latch release position and a windshield washer fluid fill position.

14. The apparatus of claim 13, further including an abutment for engaging and holding said cap in said closed position when said apparatus is in said front grille emblem display position.

15. The apparatus of claim 4, wherein said windshield washer fluid receiver is pivotally connected to said motor vehicle and said hood release actuator is pivotally connected to said windshield washer fluid receiver.

16. The apparatus of claim 15, further including a cap pivotally connected to said windshield washer fluid receiver and displaceable between an opened position and a closed position.

17. The apparatus of claim 16, further including a spring biasing said cap into said opened position.

18. The apparatus of claim 17, wherein said apparatus is displaceable between a front grille emblem display position, a hood latch release position and a windshield washer fluid fill position.

19. The apparatus of claim 18, further including an abutment for engaging and holding said cap in said closed position when said apparatus is in said front grille emblem display position.

20. The apparatus of claim 4 wherein said windshield washer fluid receiver forms an inner portion of said front grille emblem and said hood release actuator forms a perimeter portion of said front grille emblem.

* * * * *